(12) United States Patent
Tsuchiya

(10) Patent No.: US 7,072,139 B2
(45) Date of Patent: Jul. 4, 2006

(54) CARTRIDGE LOCKING MECHANISM FOR MAGNETIC TAPE APPARATUS

(75) Inventor: Manabu Tsuchiya, Yamagata (JP)

(73) Assignee: NEC Corporation, Tokyo (JP)

( * ) Notice: Subject to any disclaimer, the term of this patent is extended or adjusted under 35 U.S.C. 154(b) by 596 days.

(21) Appl. No.: 10/307,415

(22) Filed: Dec. 2, 2002

(65) Prior Publication Data

US 2003/0103291 A1 Jun. 5, 2003

(30) Foreign Application Priority Data

Dec. 3, 2001 (JP) .............................. 2001-368710

(51) Int. Cl.
*G11B 15/68* (2006.01)
(52) U.S. Cl. .................................... 360/96.5
(58) Field of Classification Search ................ 360/96.5
See application file for complete search history.

(56) References Cited

U.S. PATENT DOCUMENTS

| | | | |
|---|---|---|---|
| 4,609,955 A | 9/1986 | Sims, Jr. | |
| 5,373,406 A * | 12/1994 | Jansen | 360/96.5 |
| 5,448,432 A * | 9/1995 | Saga et al. | 360/96.5 |
| 6,141,180 A * | 10/2000 | Smith | 360/96.5 |
| 6,188,541 B1 | 2/2001 | Ohkita et al. | |
| 6,310,745 B1* | 10/2001 | Smith | 360/96.5 |
| 6,320,722 B1* | 11/2001 | Tsuchiya et al. | 360/96.5 |
| 6,515,823 B1* | 2/2003 | Kim | 360/96.5 |
| 6,621,657 B1* | 9/2003 | McCormack et al. | 360/96.5 |
| 6,710,971 B1* | 3/2004 | Nawa | 360/96.5 |
| 6,943,982 B1* | 9/2005 | Flaherty et al. | 360/96.5 |

FOREIGN PATENT DOCUMENTS

| | | |
|---|---|---|
| EP | 0 398 317 | 11/1990 |
| EP | 0 567 041 A2 | 10/1993 |
| JP | 10-340508 | 12/1998 |
| JP | 11-312348 | 11/1999 |
| JP | 2000-331403 | 11/2000 |
| JP | 2001-118305 | 4/2001 |

* cited by examiner

*Primary Examiner*—William Klimowicz
*Assistant Examiner*—Mark Blouin
(74) *Attorney, Agent, or Firm*—McGinn IP Law Group, PLLC

(57) ABSTRACT

A cartridge locking mechanism for a magnetic tape apparatus wherein variation of the pulling out force for a cartridge is prevented so that the cartridge can be removed smoothly is disclosed. A right guide plate and a left guide plate are provided for movement on the inner sides of a right side plate and a left side plate on the opposite sides of a deck base, respectively, and a cartridge tray is inserted in the inner sides of the right guide plate and the left guide plate. A right locking lever and a cam lever, and a left locking lever and a cam lever for locking a cartridge are provided for rocking movement on pins provided at lower portions on the opposite sides of the cartridge tray each through a torsion spring and a torsion spring. A guide pin and a pair of pins are provided on side faces of the cartridge tray and fitted in guide slots in the right side plate and right guide plate and the left side plate and left guide plate, respectively, to guide the cartridge tray.

24 Claims, 17 Drawing Sheets

CARTRIDGE LOCKING MECHANISM FOR MAGNETIC TAPE APPARATUS

BACKGROUND OF THE INVENTION

1. Field of the Invention

The present invention relates to a cartridge locking mechanism for locking a magnetic tape cartridge in a magnetic tape apparatus.

2. Description of the Related Art

In a magnetic tape apparatus, when a cartridge is inserted into a cartridge tray, it is necessary to lock the cartridge so that it may not come out of the cartridge tray, but when the cartridge is to be removed, it is necessary to unlock the cartridge so that the cartridge can be removed smoothly. It is demanded that a cartridge locking mechanism satisfy the two requirements just described.

A cartridge locking mechanism of the type described is disclosed in Japanese Patent Laid-Open No. 2001-118305. The cartridge locking mechanism is shown in FIGS. 15(a), 15(b), 16, 17(a) and 17(b).

Referring to FIGS. 15(a) to 17(b), the cartridge locking mechanism shown is so structured that it locks one of the opposite left and right sides of a cartridge and includes a locking lever 19 supported for pivotal motion by a vertical pin 20-1 only on the right side face of a cartridge tray 20 into which a cartridge 1 is inserted. A hooked portion 19-1 shown in FIG. 16 is provided at a tip end of the locking lever 19 such that it projects toward the cartridge tray 20 side, and first and second inclined faces 19-2 and 19-3 are formed on the opposite side faces of a tip end projection which projects downwardly from the hooked portion 19-1.

As particularly seen in FIG. 15(b), a tension spring 21 extends between a spring anchoring pin 19-4 extending vertically from a lower end of the locking lever 19 and a spring anchoring pin 20-2 extending vertically from the rear face side of the cartridge tray 20 so that torque toward the inner side of the cartridge tray 20 is applied to the locking lever 19 from the tension spring 21.

In a standby state before the cartridge 1 is inserted into the cartridge tray 20, the second inclined face 19-3 of the locking lever 19 engages with a locking pin 22 formed in a projecting manner on a base not shown of the cartridge tray 20 as seen in FIG. 15(b) so that the locking lever 19 is held in an unlocking state wherein it does not lock the cartridge 1.

If the cartridge 1 is inserted into the magnetic tape apparatus, then the cartridge tray 20 is pushed in together with the cartridge 1, whereupon the locking lever 19 and the cartridge tray 20 are placed into a demounted positional relationship as seen in FIG. 17(b) wherein the hooked portion 19-1 of the locking lever 19 is fitted in a locking hole 1-1 formed on a side face of the cartridge 1 to lock the cartridge 1. In this instance, since the biasing force acting in the direction indicated by an arrow mark F in FIG. 17(b) is applied to the cartridge tray 20, the locking lever 19 is restricted by the locking pin 22 and keeps its locking state.

If the cartridge 1 is pulled off from the cartridge tray 20 in the state illustrated in FIGS. 17(a) and 17(b), then the locking lever 19 is pulled off together with the cartridge 1. Also in this instance, since the cartridge tray 20 is biased in the direction indicated by the arrow mark F in FIG. 17(b) by the above-mentioned spring not shown, the engaging position between the tip end of the locking lever 19 and the locking pin 22 changes from the first inclined face 19-2 to the second inclined face 19-3, whereupon the locking lever 19 is pushed open to unlock the cartridge 1.

With the cartridge locking mechanism described above, however, particularly where an automatic loader is used to load and unload a medium, when the cartridge is removed by means of a picker, high pulling out force is sometimes required and therefore the cartridge cannot be removed because of insufficient pulling out force.

In particular, since the cartridge locking mechanism locks only one side of the cartridge 1, when the cartridge 1 is to be pulled off, a moment acts around the hooked portion 19-1 of the locking lever 19 and varies the pulling out force of the cartridge 1. Further, if the first inclined face 19-2 of the locking lever 19 is disengaged from the locking pin 22 by an impact or the like to cancel the lock inadvertently, then the cartridge 1 may possibly be ejected from the cartridge tray 20.

SUMMARY OF THE INVENTION

It is an object of the present invention to provide a cartridge locking mechanism for a magnetic tape apparatus wherein variation of the pulling out force for a cartridge is prevented so that the cartridge can be removed smoothly.

It is another object of the present invention to provide a cartridge locking mechanism for a magnetic tape apparatus which can prevent inadvertent ejection of a cartridge.

In order to attain the objects described above, according to the present invention, there is provided a cartridge locking mechanism for a magnetic tape apparatus for locking a cartridge of a magnetic tape inserted in a cartridge tray against ejection and unlocking the cartridge when a removing operation is performed for the cartridge, comprising a deck base and a pair of left and right side plates provided uprightly in an opposing relationship to each other on the deck base, the cartridge tray being mounted for forward and backward movement on the inner sides of the left and right side plates, a pair of left and right locking levers mounted on the cartridge tray for being rocked in a locking direction by insertion of a cartridge into the cartridge tray to engage with a pair of left and right locking portions of the cartridge to lock the cartridge against ejection, and unlocking means operable when the cartridge is moved so as to be removed from the cartridge tray for rocking the left and right locking levers simultaneously in an unlocking direction to cancel the engagement of the locking levers with the locking portions of the cartridge.

The unlocking means may include a pair of left and right unlocking portions provided on the left and right side plates such that, when the cartridge is moved so as to be removed from the cartridge tray, the left and right locking levers are brought into contact with and rocked in the unlocking direction by the left and right unlocking portions, respectively, to cancel the engagement thereof with the locking portions of the cartridge.

Preferably, the cartridge locking mechanism further comprises a pair of left and right cam levers provided along the left and right locking levers and having cam portions which engage, when the cartridge is inserted into the cartridge tray, with the cartridge to rock the left and right locking levers in the locking direction, respectively.

The left and right locking levers and the left and right cam levers may be supported for rocking motion on common left and right pivots, respectively, and the cartridge locking mechanism may further comprise a returning spring provided for each of the left and right locking levers and the left and right cam levers.

Preferably, the left and right locking levers are supported for forward and backward movement within a predetermined range with respect to the respective pivots.

The left and right locking levers may have hooked portions for engaging with the left and right locking portions of the cartridge, and the left and right unlocking portions may be cams for engaging with the hooked portions of the left and right locking levers to rock the left and right locking levers in the unlocking direction, respectively.

Preferably, the cartridge locking mechanism further comprises a pair of left and right guide plates mounted for forward and backward movement along the inner sides of the left and right side plates, respectively, each of the guide plates having a vertical movement guiding portion for guiding the cartridge tray for upward and downward movement. The vertical movement guide portion may be a guide groove for receiving a pin provided in an projecting manner on a side face of the cartridge tray to guide the pin for sliding movement therein.

The left and right guide plates may have racks formed on upper edges thereof, and the racks may be operatively connected to each other by a rotation transmitting mechanism so that the left and right guide plates are moved forwardly and backwardly in synchronism with each other through the racks.

The cartridge locking mechanism may further comprise a sensor for detecting the cartridge inserted into or removed from the cartridge tray, and the unlocking means may include an actuator for pivoting the left and right locking levers in the locking direction or the unlocking direction in response to a detection signal of the sensor.

The left and right locking levers may be mounted for forward and backward movement on the cartridge tray such that, when the cartridge is operated so as to be removed from the cartridge tray, the left and right locking levers are moved together with the cartridge, and when the movement of the cartridge is detected by the sensor, the left and right locking levers may be pivoted in the unlocking direction by the actuator.

With the cartridge locking mechanism for a magnetic tape apparatus, the left and right locking levers mounted on the cartridge tray are engaged with the left and right locking portions of the cartridge to lock the cartridge against ejection. Then, when the cartridge is operated so as to be removed from the cartridge tray, the left and right locking levers are rocked simultaneously in the unlocking direction by the unlocking means to cancel the engagement of the left and right locking levers with the left and right locking portions of the cartridge. Consequently, variation of the pulling out force for the cartridge can be prevented, and therefore, the cartridge can be removed smoothly.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENT

Figure 1A:
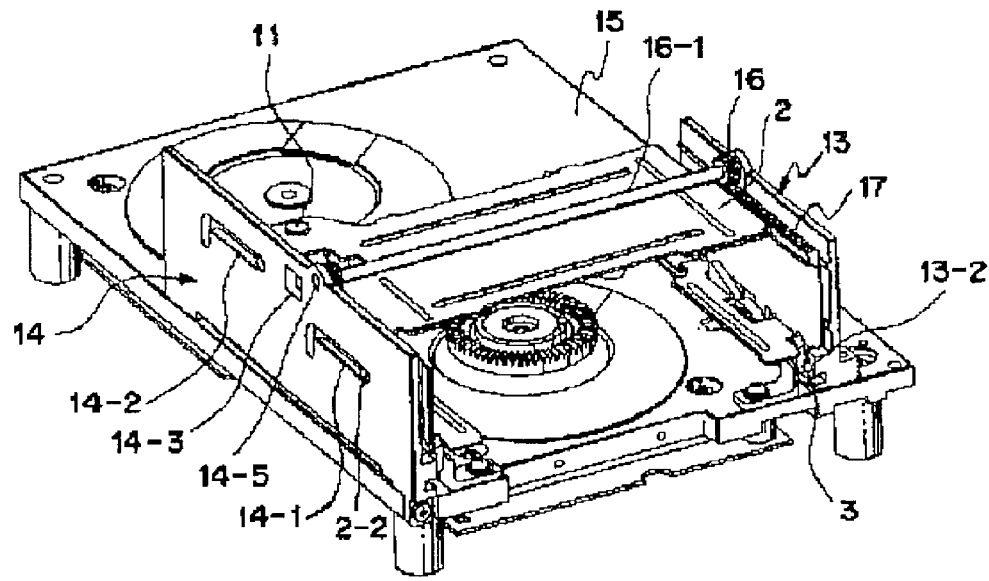
FIGS. 1(a) and 1(b) are perspective views of a cartridge locking mechanism for a magnetic tape apparatus to which the present invention is applied as viewed from a forwardly leftwardly upward position and a forwardly rightwardly upward position, respectively.

Referring to FIGS. 1(a) to 3(b), there is shown a cartridge locking mechanism for a magnetic tape apparatus to which the present invention is applied. The cartridge locking mechanism shown includes a right side plate 13 and a left side plate 14 extending uprightly in parallel to each other from the opposite left and right sides of a rectangular deck base 15, a right guide plate 17 and a left guide plate 18 mounted for movement and extending long the inner faces of the right side plate 13 and the left side plate 14, respectively, and a gate-shaped cartridge tray 2 inserted between the right guide plate 17 and the left guide plate 18. The cartridge locking mechanism has a substantially leftwardly and rightwardly symmetrical structure, and a cartridge 1 shown in FIGS. 4(a) to 4(c) is removably inserted into the cartridge tray 2.

Figure 3A:
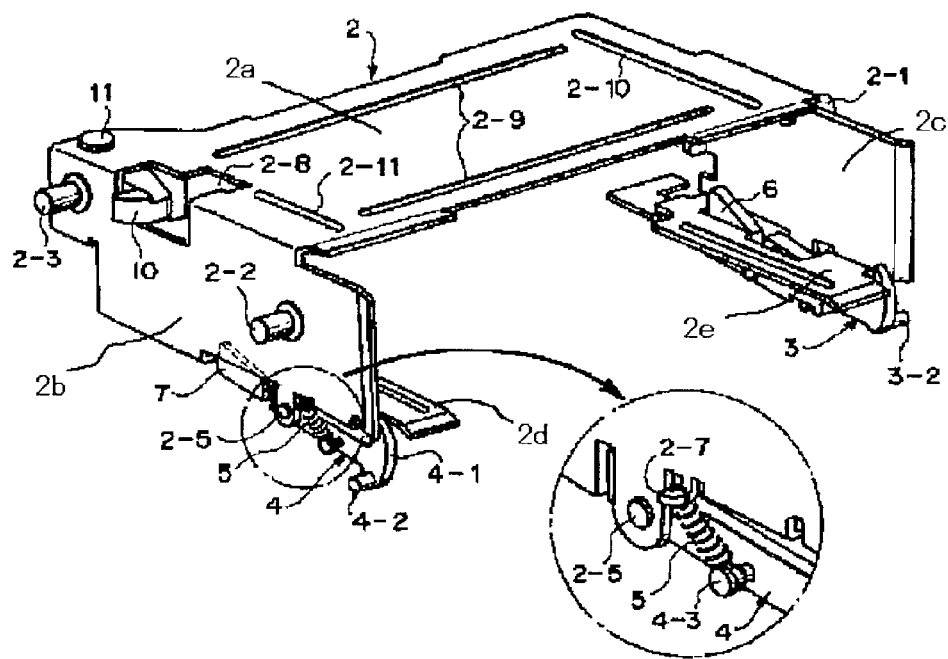
FIGS. 3(a) and 3(b) are perspective views illustrating movements of locking levers and tray locking levers incorporated in the cartridge tray before insertion of a cartridge as viewed from a forwardly leftwardly upward position and a forwardly rightward position, respectively.
Figure 3B:
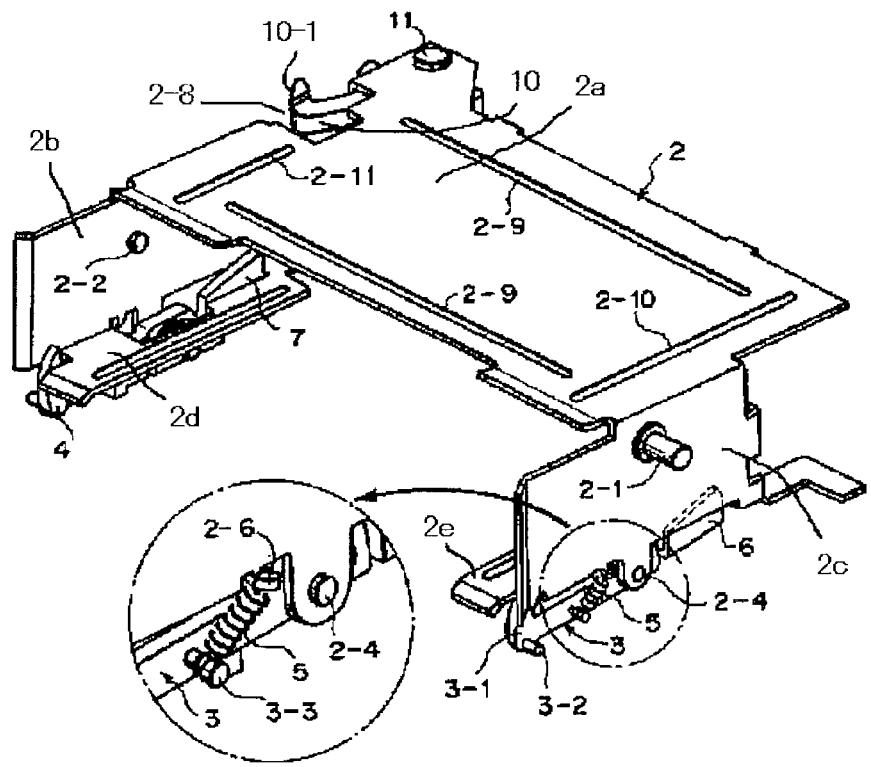
Figure 4A:
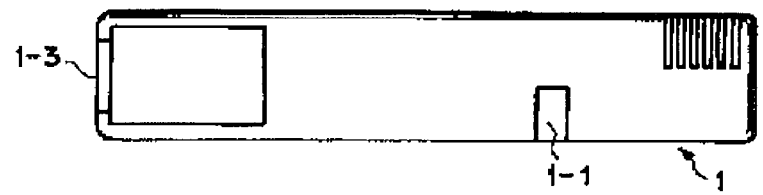
FIGS. 4(a), 4(b) and 4(c) are a rear elevational view, a plan view and a front elevational view, respectively, showing an appearance of a cartridge adapted to be inserted into the cartridge tray.
Figure 4B:
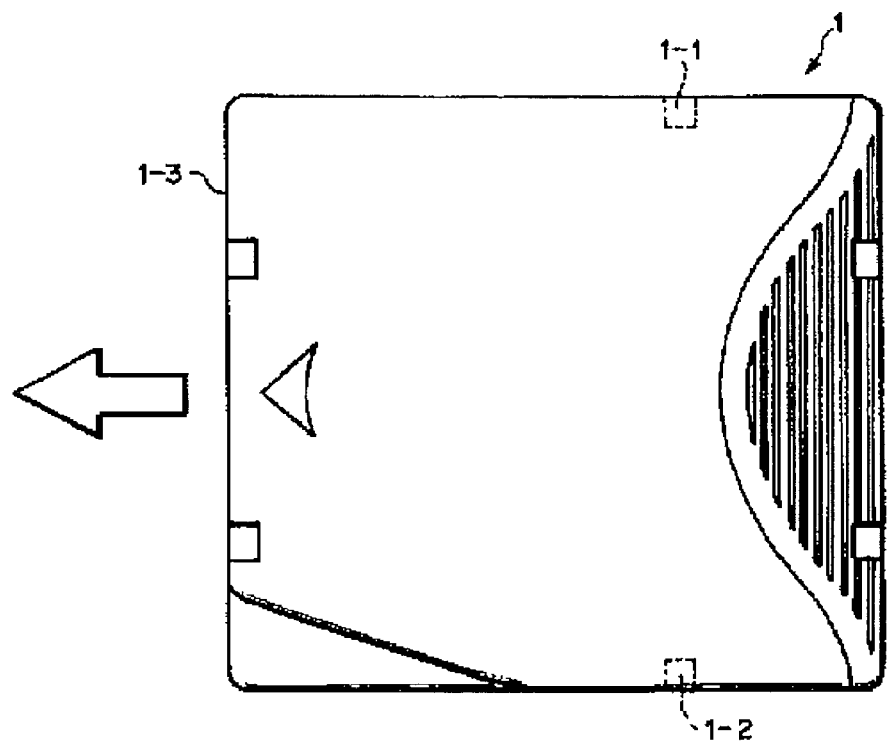
Figure 4C:
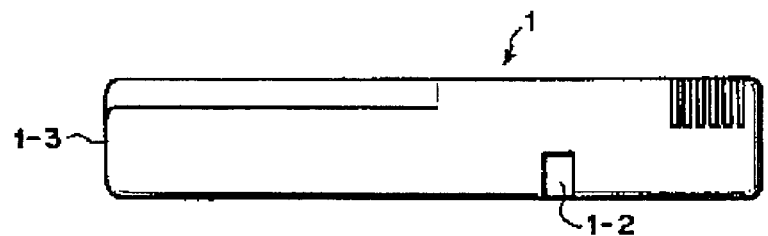

As particularly seen in FIGS. 3(a) and 3(b), the cartridge tray 2 includes a top plate portion 2a, a pair of left and right side plate portions 2b and 2c, and a pair of left and right cartridge supporting portions 2d and 2e extending inwardly from the lower ends of the side plate portions 2b and 2c, respectively. A guide pin 2-1 is provided in a projecting manner at an intermediately upper portion of an outer face of the right side plate portion 2c of the cartridge tray 2, and a short pivot 2-4 is provided in a projecting manner on an outer face of a lower end projection of the right side plate portion 2c of the cartridge tray 2 below the guide pin 2-1 and a spring anchoring lug 2-6 is provided closely on the front side of the pivot 2-4. Meanwhile, a front side guide pin 2-2 is provided in a projecting manner on an outer face of a front portion of the left side plate portion 2b of the cartridge tray 2, and a rear side guide pin 2-3 is provided in a projecting manner on an outer face of a rear portion of the left side plate portion 2b of the cartridge tray 2. Further, a short pivot 2-5 is provided in a projecting manner on an outer face of a lower end projection of the left side plate portion 2b of the cartridge tray 2 below the guide pin 2-3, and a spring anchoring lug 2-7 is provided closely on the front side of the pivot 2-5.

A cutaway portion 2-8 is formed at a left side rear portion of the cartridge tray 2 by cutting away part of the top plate portion 2a and part of the left side plate portion 2b, and a pair of elongated ribs 2-9 and 2-10 and a rib 2-11 for raising the flexural rigidity of the cartridge tray 2 are formed on an upper face of the top plate portion 2a.

Figure 2A:
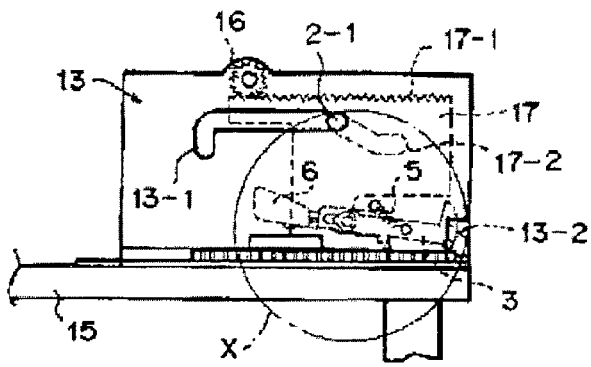
FIGS. 2(a), 2(b) and 2(c) are a rear elevational view, a plan view and a front elevational view, respectively, of a cartridge tray, a tray locking mechanism and the cartridge locking mechanism of the magnetic tape apparatus.

A right locking lever 3 is mounted for rocking motion on the lower side of the right side cartridge supporting portion 2e on the right side of the cartridge tray 2 while a left locking lever 4 is mounted for rocking motion on the lower side of the cartridge supporting portion 2 don the left side of the cartridge tray 2 in the following manner. A portion indicated by a reference character X in FIG. 2(a) is shown in an enlarged scale to particularly show the right locking lever 3 in FIGS. 5(a), 5(b) and 5(c), and another portion indicated by another reference character Y in FIG. 2(c) is shown in an enlarged scale to particularly show the left locking lever 4 in FIGS. 5(d), 5(e) and 5(f).

Figure 5A:
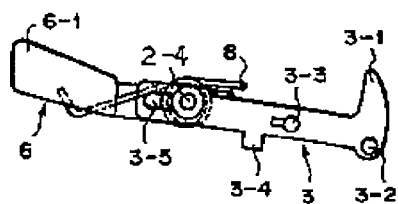
FIGS. 5(a), 5(b), 5(c), 5(d), 5(e) and 5(f) are a rear elevational view, a plan view and a front elevational view, and a rear elevational view, a plan view and a front elevational view, respectively, showing, in an enlarged scale, left and right locking levers of the tray locking mechanism before insertion of a cartridge, respectively.
Figure 5D:
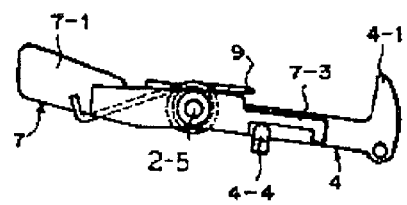
Figure 5B:
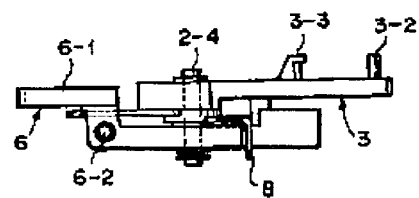
Figure 5E:
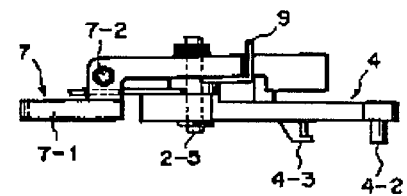
Figure 5C:
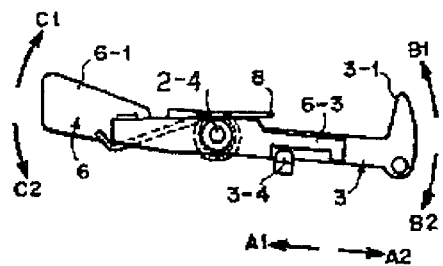

Referring to FIGS. 5(a) to 5(c), the right locking lever 3 has an elongated hole 3-5 formed at a rear portion thereof and is fitted at the elongated hole 3-5 thereof with the pivot 2-4 such that it is mounted for rocking motion in upward and downward directions and also for bodily movement in forward and backward directions around and on the pivot 2-4. The right locking lever 3 has an upwardly extending hooked portion 3-1 at a front end thereof, a horizontally extending boss 3-2 at a portion there of below the hooked portion 3-1, a spring anchoring pin 3-3 at an intermediate portion of the right side face thereof, and a projection 3-4 at a portion thereof below the spring anchoring pin 3-3. A locking lever spring 5 in the form of a tension spring extends between the spring anchoring pin 3-3 and the spring anchoring lug 2-6 on the right side plate portion 2c side as shown in FIG. 3(b). Consequently, the right locking lever 3 is biased in a direction indicated by an arrow mark A1 in FIG. 5(c) by the locking lever spring 5 and besides is normally acted upon by an upward moment indicated by an arrow mark B1 around the pivot 2-4.

A cam lever 6 is supported at an intermediate portion thereof for pivotal motion around the pivot 2-4 on the inner face of the right locking lever 3. The cam lever 6 has a moderately inclined cam portion 6-1 formed at an upper end of a rear portion thereof, and has a stop 6-2 at an upper end of a base portion of the cam portion 6-1 and has a hand 6-3 at a front end of the cam portion 6-1. The hand 6-3 contacts at a lower face thereof with an upper face of the projection 3-4 of the right locking lever 3.

Further, a torsion spring 8 is wrapped around the pivot 2-4 and extends between the right locking lever 3 and the cam lever 6. The torsion spring 8 is anchored at an end thereof by a lower end of the cam lever 6 and at the other end thereof by a lower portion (not shown) on the right side of the cartridge tray 2.

Accordingly, even if the moment exerted by the locking lever spring 5 in the direction indicated by an arrow mark B1 acts upon the right locking lever 3, since the hand 6-3 is held in engagement with the upper face of the projection 3-4 under the returning force of the torsion spring 8, the right locking lever 3 maintains its horizontal position shown in FIGS. 5(a) and 5(b).

As a result, the cam lever 6 is normally acted upon by the moment in the direction indicated by an arrow mark C1 in FIG. 5(c) around the pivot 2-4 by the returning force of the torsion spring 8. Accordingly, the right locking lever 3 is normally positioned such that an end portion thereof projects upwardly farther than the upper face of the right side cartridge supporting portion 2e of the cartridge tray 2 and an end portion of the cam portion 6-1 of the cam lever 6 projects upwardly farther than the upper face of the right side cartridge supporting portion 2e of the cartridge tray 2 as seen in FIG. 3(a). In this state, the cartridge 1 is inserted into the cartridge tray 2 in such a manner as hereinafter described.

Figure 5F:
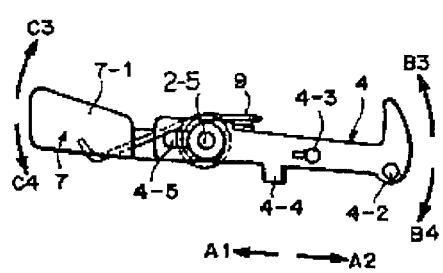

Similarly, referring to FIGS. 5(d) to 5(f), the left locking lever 4 has an elongated hole 4-5 formed at a rear portion thereof and is fitted at the elongated hole 4-5 thereof with the pivot 2-5 such that it is mounted for rocking motion in upward and downward directions and also for bodily movement in forward and backward directions around and on the pivot 2-5. Also the left locking lever 4 has an upwardly extending hooked portion 4-1 at a front end thereof, a horizontally extending boss 4-2 at a portion thereof below the hooked portion 4-1, a spring anchoring pin 4-3 at an intermediate portion of the right side face thereof, and a projection 4-4 at a portion thereof below the spring anchoring pin 4-3. A locking lever spring 5 in the form of a tension spring extends between the spring anchoring pin 4-3 and the spring anchoring lug 2-7 on the left side plate portion 2b side as shown in FIG. 3(a). Consequently, the left locking lever 4 is biased in a direction indicated by an arrow mark A1 in FIG. 5(*f*) by the locking lever spring 5 and is normally acted upon by an upward moment indicated by an arrow mark B3 around the pivot 2-5.

A cam lever 7 is supported at an intermediate portion thereof for pivotal motion around the pivot 2-5 also on the inner face of the left locking lever 4. The cam lever 7 has a moderately inclined cam portion 7-1 formed at an upper end of a rear portion thereof, and has a stop 7-2 at an upper end of a base portion of the cam portion 7-1 and has a hand 7-3 at a front end of the cam portion 7-1. The hand 7-3 engages at a lower face thereof with an upper face of the projection 4-4 of the left locking lever 4.

Further, a torsion spring 9 is wrapped around the pivot 2-5 and extends between the left locking lever 4 and the cam lever 7. The torsion spring 9 is anchored at an end thereof by a lower end of the cam lever 7 and at the other end thereof by a lower portion (not shown) on the left side of the cartridge tray 2.

Accordingly, even if the moment exerted by the locking lever spring 5 in the direction indicated by the arrow mark B3 acts upon the left locking lever 4, since the hand 7-3 is held in engagement with the upper face of the projection 4-4 by the returning force of the torsion spring 9, the left locking lever 4 maintains its horizontal position shown in FIGS. 5(*b*) and 5(*f*).

As a result, the cam lever 7 is normally acted upon by the moment in the direction indicated by an arrow mark C3 in FIG. 5(*f*) around the pivot 2-5 by the returning force of the torsion spring 9. Accordingly, the left locking lever 4 is normally positioned such that an end portion of the hook 4-1 thereof projects upwardly farther than the upper face of the left side cartridge supporting portion 2*d* of the cartridge tray 2 and an end portion of the cam portion 7-1 of the cam lever 7 projects upwardly farther than the upper face of the left side cartridge supporting portion 2*d* of the cartridge tray 2 as seen in FIG. 3(*b*). In this state, the cartridge 1 is inserted into the cartridge tray 2 in such a manner as hereinafter described.

Meanwhile, as shown in the Z portion in FIG. 2(*b*) and FIG. 3(*a*), a tray locking lever shaft 11 extends downwardly from a left rear corner portion of the top plate portion 2*a* of the cartridge tray 2, and a tray locking lever or crank lever 10 for locking the cartridge tray 2 to the left side plate 14 in such a manner as hereinafter described is supported for horizontally pivotal motion on the tray locking lever shaft 11. FIGS. 6(*a*) and 6(*b*) show the tray locking lever 10 in an enlarged scale.

Referring to FIGS. 6(*a*) and 6(*b*), the tray locking lever 10 has longer and shorter arms and has a hooked portion 10-1 at an end of the longer arm thereof and a cam portion 10-2 at an end of the shorter arm thereof. A torsion spring 12 is wound around the tray locking lever shaft 11 on the lower side of the tray locking lever 10 and is anchored at one end thereof by the front face side of the cam portion 10-2 and at the other end thereof by the front end (not shown) of the cartridge tray 2.

Accordingly, the tray locking lever 10 is normally acted upon by torque in a clockwise direction indicated by an arrow mark D2 in FIG. 6(*a*) by returning force of the torsion spring 12. Before the cartridge 1 is inserted, the hooked portion 10-1 of the tray locking lever 10 projects outwardly through the cutaway portion 2-8 formed at a left and rear portion of the cartridge tray 2 as seen in FIG. 3(*b*).

Further, referring back to FIGS. 1(*a*) to 2(*c*), a mechanism for loading the cartridge tray 2 is formed from the right side plate 13 and the left side plate 14 described hereinabove, and the right guide plate 17 and the left guide plate 18 provided for movement along the inner sides of the right side plate 13 and the left side plate 14, respectively, a pair of pinions 16 and so forth. The left and right side plate portions 2*b* and 2*c* of the cartridge tray 2 are inserted to the inner sides of the right guide plate 17 and the left guide plate 18, respectively.

Racks 17-1 and 18-1 are formed on an upper side edge of the right guide plate 17 and an upper side edge of the left guide plate 18, respectively. The pinions 16 in pair are held in meshing engagement with the racks 17-1 and 18-1 and are coupled directly to each other by a pinion shaft 16-1 which extends between upper end portions of the left and right side plates 13 and 14.

Further, a guide slot 13-1 is provided at a central portion of an upper portion of the right side plate 13, and the guide pin 2-1 of the cartridge tray 2 is fitted for sliding movement in the forward and backward directions in the guide slot 13-1. The guide slot 13-1 extends horizontally from a front end to a rear end thereof and is bent downwardly at the rear end thereof such that it extends downwardly a little. A shaft hole 13-3 is provided at an upper end portion of the right side plate 13 above the guide slot 13-1, and the pinion shaft 16-1 is supported at the right end thereof by the shaft hole 13-3 of the right side plate 13.

An unlocking cam (right side unlocking portion) 13-2 having an inclined face is formed on the inner side of a front side lower portion of the right side plate 13. When the cartridge 1 is inserted or removed, the boss 3-2 of the right locking lever 3 is engaged with the inclined face of the unlocking cam 13-2 to rock the right locking lever 3 in the downward direction.

Figure 1B:
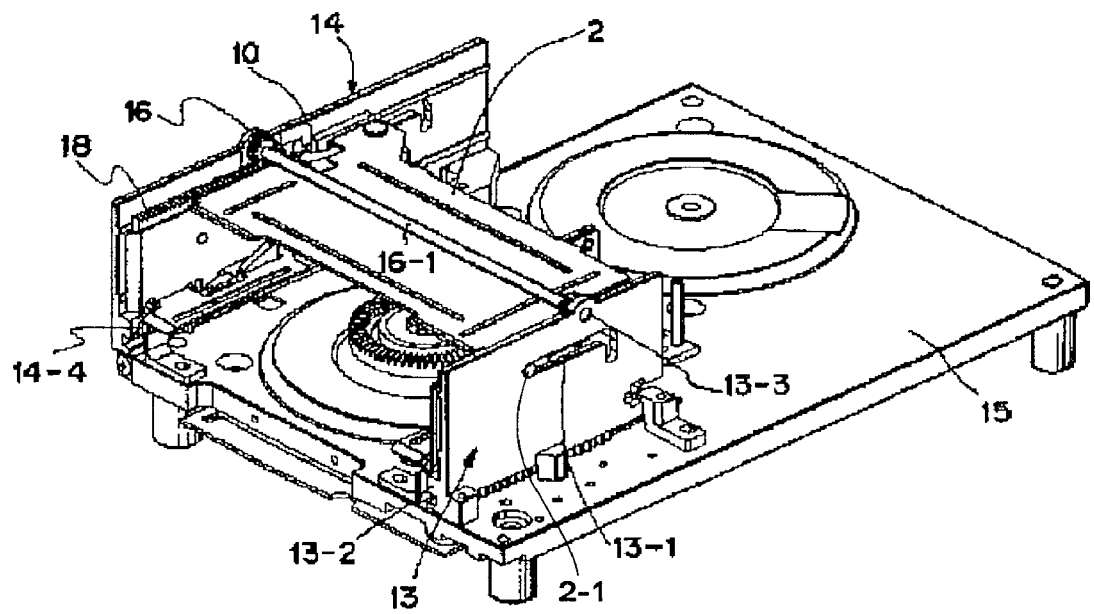

Meanwhile, a pair of front and rear guide slots 14-1 and 14-2 are formed in the left side plate 14, and the front and rear guide pins 2-2 and 2-3 on the left side of the cartridge tray 2 are fitted for sliding movement in the forward and backward directions as seen in FIGS. 1(*a*) and 2(*c*) in the front and rear guide slots 14-1 and 14-2, respectively. Also each of the front and rear guide slots 14-1 and 14-2 extends horizontally from a front end to a rear end thereof and is bent downwardly at the rear end thereof such that it extends downwardly a little. Further, a locking hole 14-3 is provided in the left side plate 14 between the front and rear guide slots 14-1 and 14-2, and the hooked portion 10-1 of the tray locking lever 10 projecting from the cutaway portion 2-8 as seen in FIG. 3(*b*) is fitted in the locking hole 14-3 to prevent malfunction upon loading of the cartridge tray 2.

Furthermore, a shaft hole 14-5 is formed at a central portion of an upper end portion of the left side plate 14 in an opposing relationship to the shaft hole 13-3 of the right side plate 13 as seen in FIG. 1(*a*), and the pinion shaft 16-1 is supported at the left end thereof by the shaft hole 14-5.

An unlocking cam (right side unlocking portion) 14-4 having an inclined face is formed on the inner side of a front side lower portion of the left side plate 14. When the cartridge 1 is inserted or removed, the boss 4-2 of the left locking lever 4 is engaged with the inclined face of the unlocking cam 14-4 to rock the left locking lever 4 in the downward direction.

Meanwhile, a vertical movement guide slot (vertical movement guide portion) 17-2 is provided in an upper portion of the right guide plate 17, and the guide pin 2-1 of the cartridge tray 2 is fitted for sliding movement in the forward and backward directions as shown in FIG. 2(*a*) in the vertical movement guide slot 17-2 while front and rear vertical movement guide slots (vertical movement guide portions) 18-2 and 18-3 are formed in the left guide plate 18 and the guide pins 2-2 and 2-3 on the right side are fitted for sliding movement in the forward and backward directions in the vertical movement guide slots 18-2 and 18-3, respectively. Each of the vertical movement guide slots 17-2 and 18-2 and 18-3 extends horizontally a little from a front end side thereof and is inclined upwardly toward a rear end thereof.

As seen in FIGS. 1(a) to 2(c), the cartridge tray 2 and the left and right guide plates 17 and 18 before a loading operation are positioned forwardly of the deck base 15. In particular, the guide pins 2-1, 2-2 and 2-3 are positioned at the rear ends of the guide slots 13-1 and 14-1 and 14-2 with respect to the side plates 13 and 14, respectively, and are positioned at the front ends of the vertical movement guide slots 17-2 and 18-2 and 18-3 with respect to the guide plates 17 and 18, respectively. Further, the left and right locking levers 3 and 4 are positioned such that they are pressed downwardly by the hands 6-3 and 7-3 of the left and right cam levers 6 and 7, respectively, as seen in FIGS. 2(a) and 2(c).

Figure 2B:
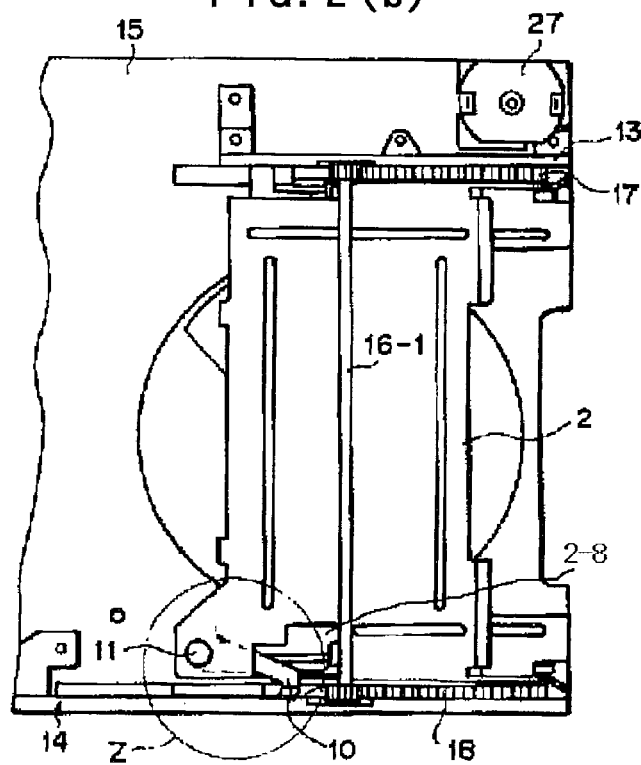
Figure 2C:
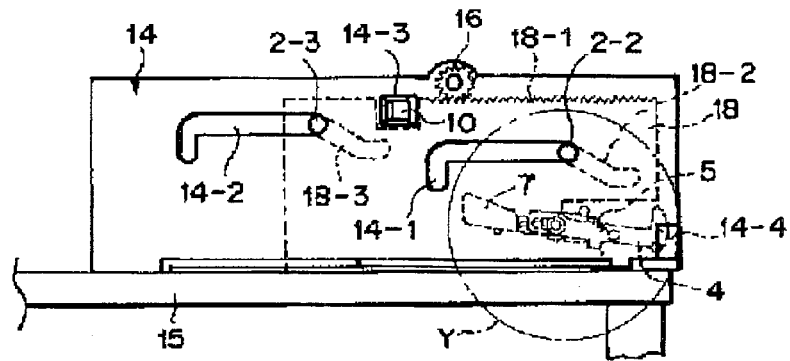

Meanwhile, the tray locking lever 10 is fitted at the hooked portion 10-1 thereof in the locking hole 14-3 of the left side plate 14 as seen in FIG. 2(c) through the cutaway portion 2-8 of the cartridge tray 2 as seen in FIG. 2(b) to lock the cartridge 1 against movement.

FIGS. 4(a) to 4(c) show the cartridge 1 which can be locked by the cartridge locking mechanism. Referring to FIGS. 4(a) to 4(c), a pair of locking holes 1-1 and 1-2 are formed at lower portions intermediately of the left and right side faces of the cartridge 1, respectively, and an end face 1-3 in an insertion direction indicated by an arrow mark in FIG. 4(b) is formed as a vertical flat face.

Operation of the cartridge locking mechanism having the configuration described above is described below.

Figure 7A:
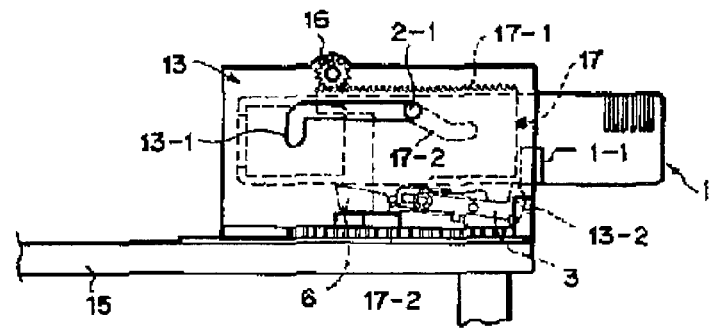
FIGS. 7(a), 7(b) and 7(c) are a rear elevational view, a plan view and a front elevational view, respectively, illustrating movements of a locking lever, a cam lever and a tray locking lever immediately after insertion of a cartridge.

If the cartridge 1 is inserted into the cartridge tray 2 in the position shown FIGS. 1(a) to 2(c), then a lower end of the end face 1-3 of the cartridge 1 is first brought into engagement with the upper faces of the cam portions 6-1 and 7-1 of the cam levers 6 and 7 which project farther than the upper faces of the cartridge supporting portions 2d and 2e of the cartridge tray 2. If the cartridge 1 is inserted further, then the bottom face of the cartridge 1 presses the cam portions 6-1 and 7-1 of the cam levers 6 and 7 as seen in FIGS. 7(a) and 7(c) to rock the left and right cam levers 6 and 7 in the downward directions indicated by arrow marks C2 and C4 in FIGS. 5(c) and 5(f), respectively.

Figure 8A:
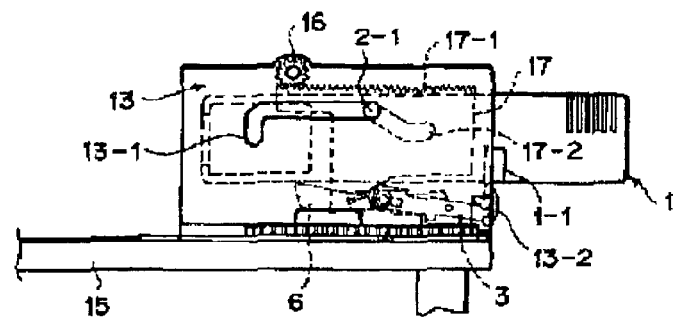
FIGS. 8(a), 8(b) and 8(c) are a rear elevational view, a plan view and a front elevational view, respectively, illustrating movements of a locking lever upon locking (in a demounted state) of a cartridge.
Figure 8B:
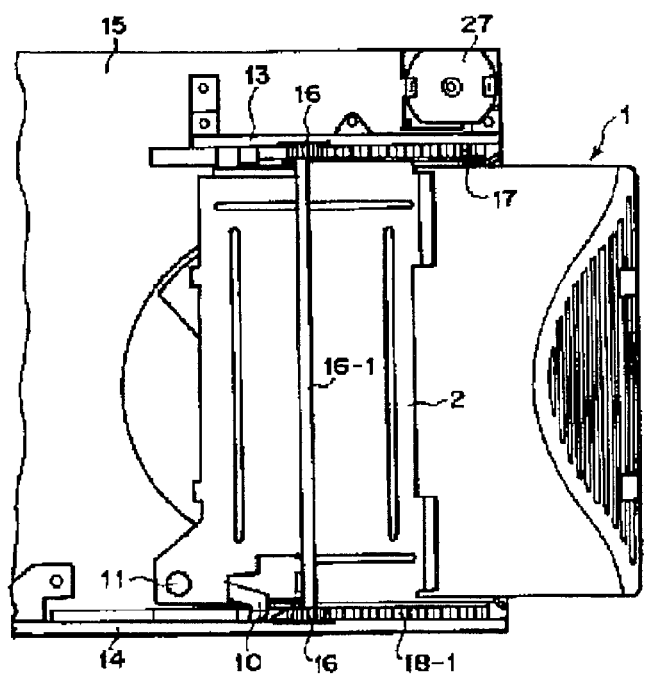
Figure 8C:
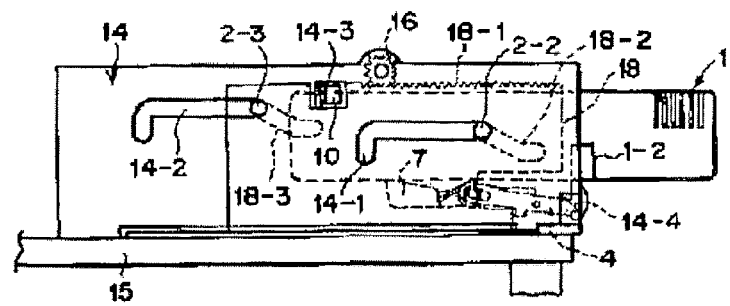

Consequently, the left and right locking levers 3 and 4 with the projections 3-4 and 4-4 of which the hands 6-3 and 7-3 of the cam levers 6 and 7 engage are rocked in upward directions indicated by arrow marks B1 and B3 in FIGS. 5(c) and 5(f), respectively, until the hooked portions 3-1 and 4-1 are fitted into the locking holes 1-1 and 1-2 of the cartridge 1, respectively, as seen in FIGS. 8(a) to 8(c) thereby to lock the cartridge 1 to the cartridge tray 2.

Accordingly, ejection of the cartridge 1 from the cartridge tray 2 is prevented, and the requirement upon insertion of a cartridge required for the cartridge locking mechanism is satisfied.

Figure 6A:
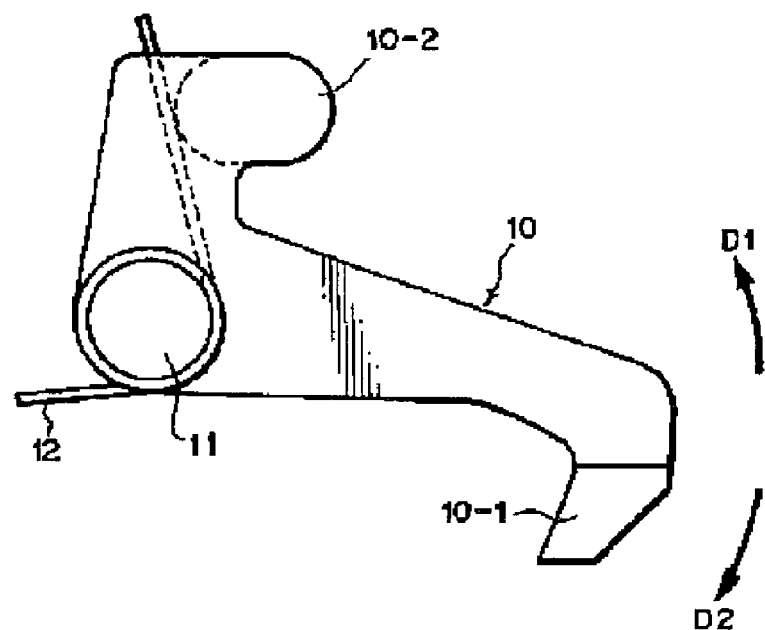
FIGS. 6(a) and 6(b) are a plan view and a rear elevational view, respectively, showing, in an enlarged scale, a tray locking lever before insertion of a cartridge.
Figure 6B:
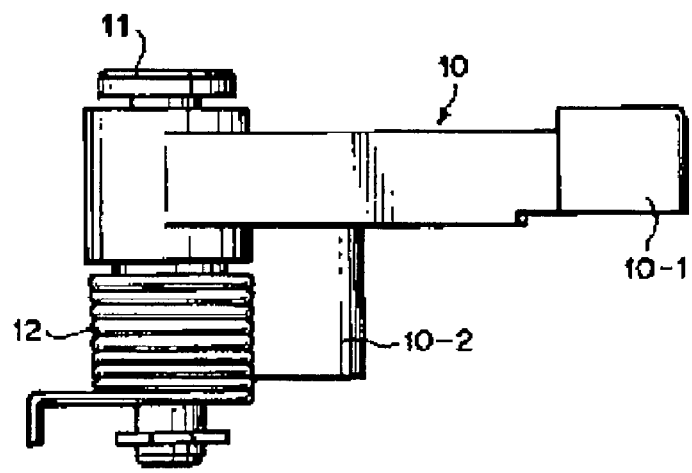
Figure 13A:
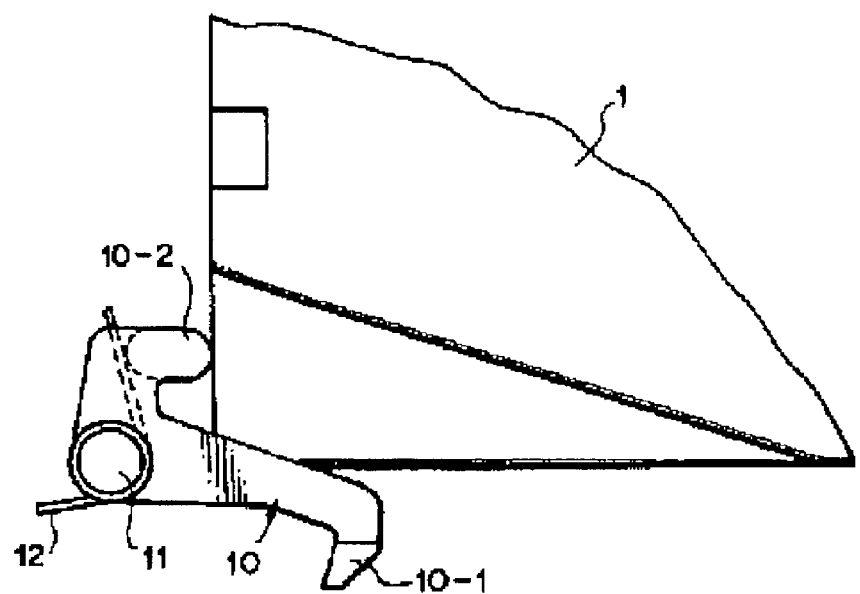
FIGS. 13(a) and 13(b) are schematic views illustrating a movement of the tray locking lever and showing the positions of a tray locking lever immediately before and after an end of the cartridge is brought into engagement therewith, respectively.
Figure 13B:
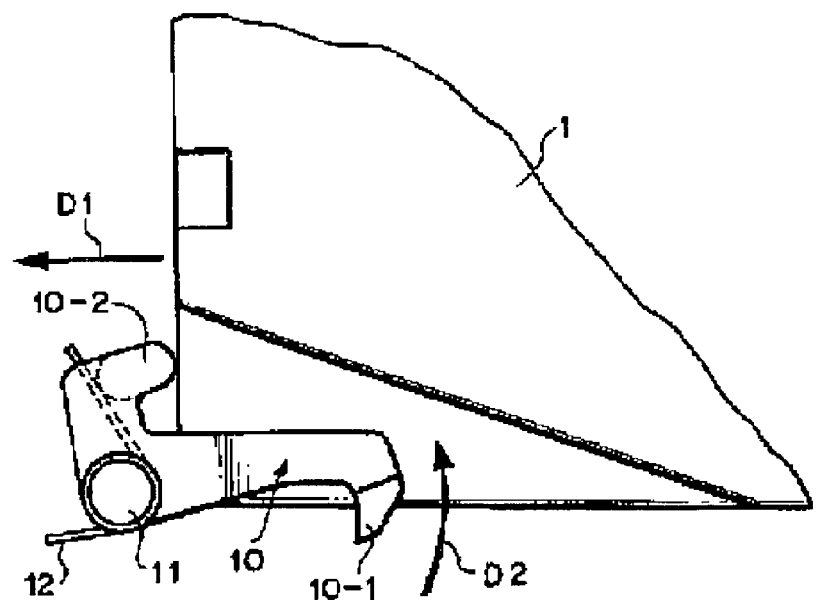

Simultaneously, the end face 1-3 of the cartridge 1 presses the cam portion 10-2 of the tray locking lever 10 to move as indicated by an arrow mark D1 of FIG. 13(b) from the position shown in FIG. 13(a), whereupon the tray locking lever 10 is pivoted in the counterclockwise direction indicated by an arrow mark D2 in FIG. 6(a) and an arrow mark D2 in FIG. 13(b). Consequently, the hooked portion 10-1 is disengaged from the locking hole 14-3 of the left side plate 14 in FIG. 8(b) thereby to unlock the cartridge tray 2.

Figure 7B:
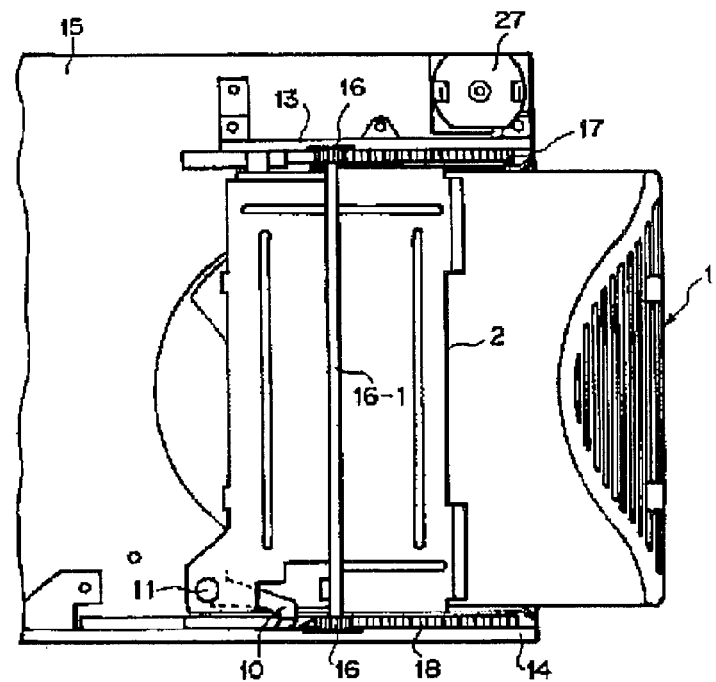
Figure 7C:
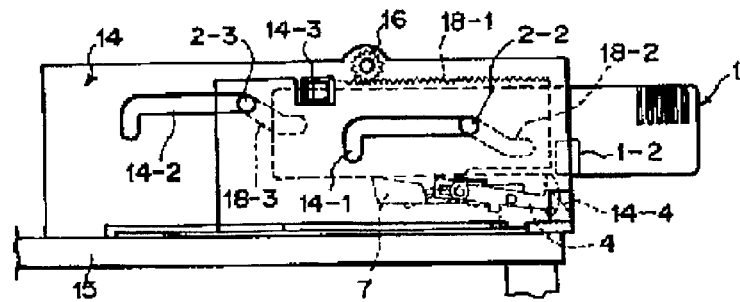
Figure 9A:
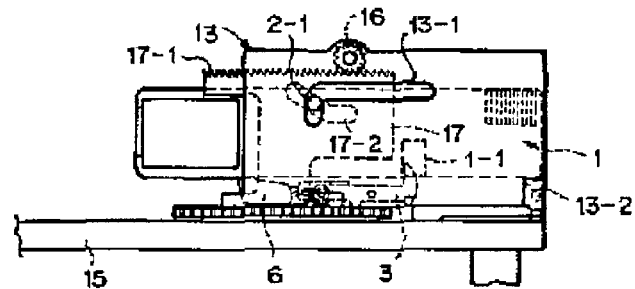
FIGS. 9(a), 9(b) and 9(c) are a rear elevational view, a plan view and a front elevational view, respectively, illustrating a cartridge loading operation of the magnetic tape apparatus.
Figure 9B:
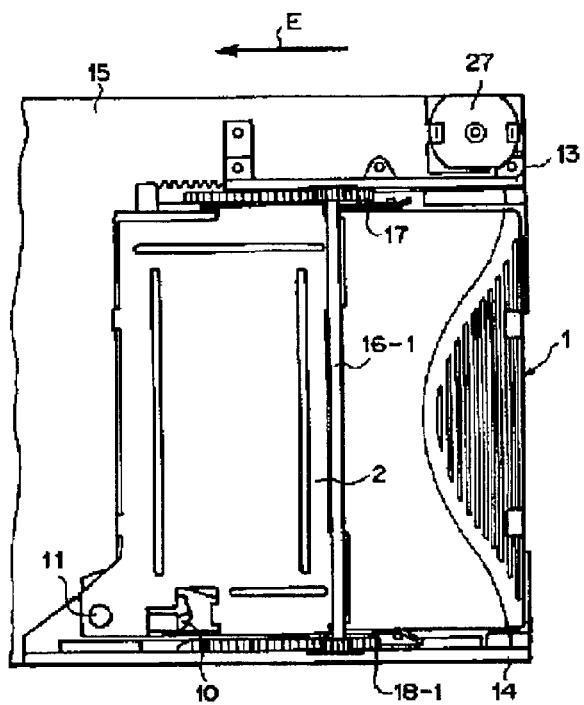
Figure 9C:
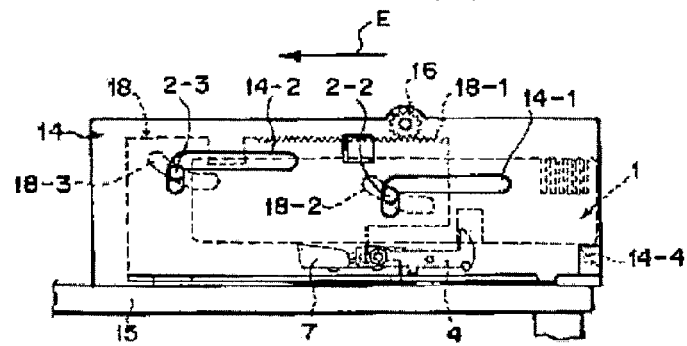

After the cartridge 1 is locked and the cartridge tray 2 is unlocked in this manner, an electric motor 27 shown in FIGS. 2(b), 7(b) and 8(b) is energized to drive the right guide plate 17 in an insertion direction indicated by an arrow mark E in FIG. 9(c) through a speed reducing gear train not shown. Consequently, the right side pinion 16 is rotated through the rack 17-1 of the right guide plate 17, and also the left guide plate 18 is driven to move in the insertion direction as indicated by an arrow mark E in FIG. 9(c) through the pinion shaft 16-1, the left side pinion 16 and rack 18-1. Consequently, the left and right guide plates 17 and 18 are simultaneously moved or advanced in the insertion direction.

Thereupon, the cartridge tray 2 is advanced, on the right side thereof, together with the guide pin 2-1 fitted in the guide slot 13-1 of the right side plate 13 and the vertical movement guide slot 17-2 of the right guide plate 17, and is advanced, also on the left side thereof, together with the front side guide pin 2-2 fitted in the guide slot 14-1 and the vertical movement guide slot 18-2 and the rear side guide pin 2-3 fitted in the guide slot 14-2 and the vertical movement guide slot 18-3. The movements on the left and right sides of the cartridge tray 2 are synchronized with each other by the pinion shaft 16-1.

Figure 10A:
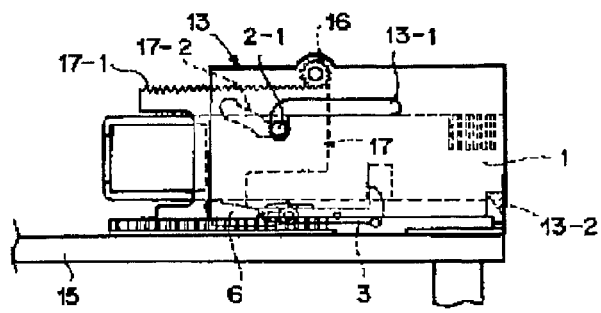
FIGS. 10(a), 10(b) and 10(c) are a rear elevational view, a plan view and a front elevational view, respectively, illustrating a state (mounted state) after completion of insertion of the cartridge.
Figure 10B:
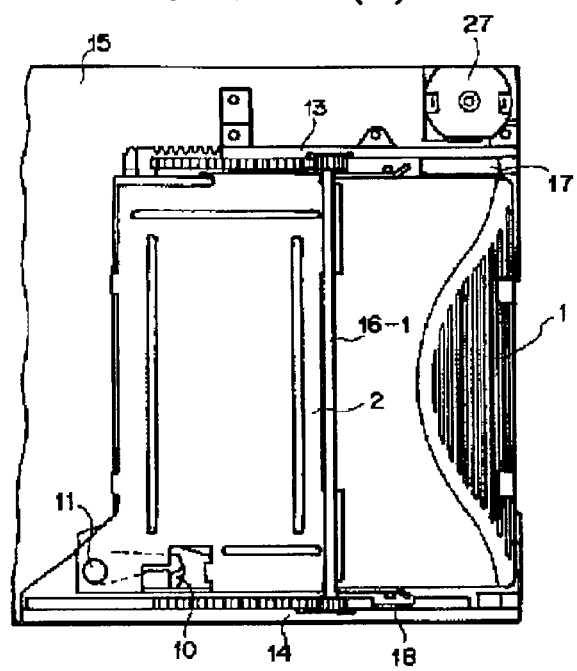
Figure 10C:
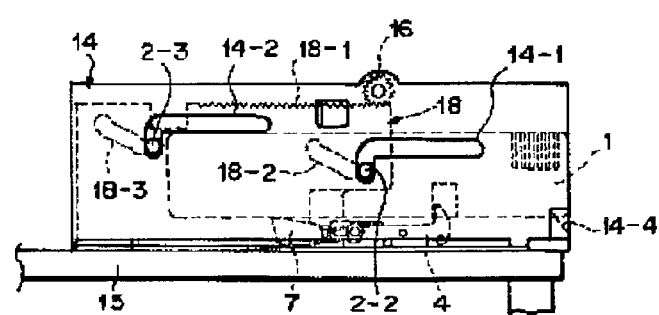
Figure 11A:
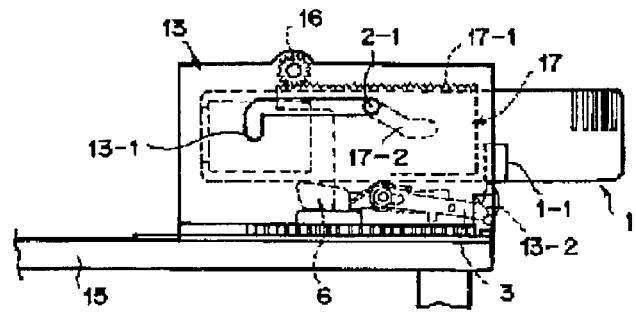
FIGS. 11(a), 11(b) and 11(c) are a rear elevational view, a plan view and a front elevational view, respectively, showing a locking lever and a cam lever when the cartridge is pulled off from the cartridge tray.
Figure 11B:
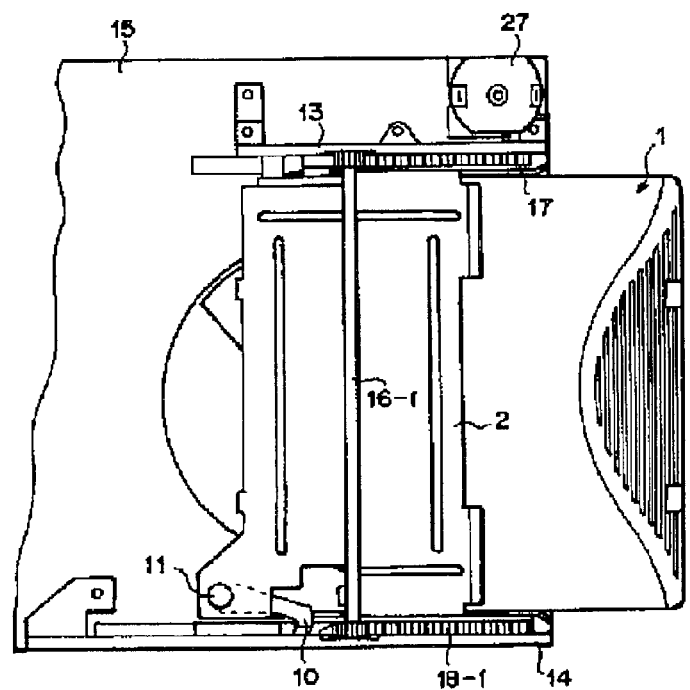
Figure 11C:
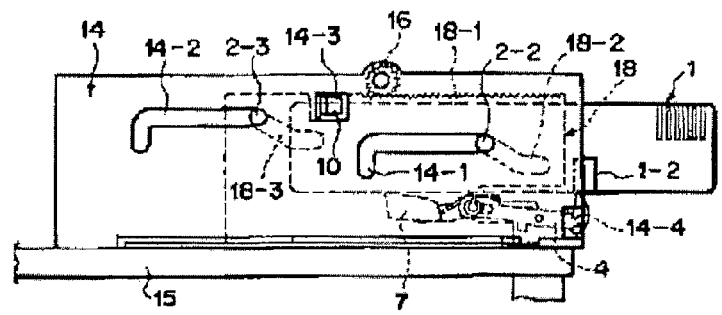

The cartridge tray 2 is restricted from further advancement when the guide pins 2-1, 2-2 and 2-3 come to the front ends of the guide slots 13-1, 14-1 and 14-2 of the left and right side plates 13 and 14 as seen in FIGS. 9(a) and 9(c), respectively. However, since the left and right guide plates 17 and 18 are further advanced, the guide pin 2-1 gradually moves down along the vertical movement guide slot 17-2 of the right guide plate 17 until it comes to the lower end of the bent portion at the end of the guide slot 13-1 as seen in FIGS. 10(a) and 10(c), and also the guide pins 2-2 and 2-3 gradually move down along the vertical movement guide slots 18-2 and 18-3 of the left guide plate 18 until they come to the lower ends of the bent portions at the ends of the guide slots 14-1 and 14-2, respectively. Thereupon, the left and right guide plates 17 and 18 come to their loading completion position, at which they are stopped. Consequently, the cartridge tray 2 is moved down while it remains restricted from advancement.

Upon unloading of the cartridge 1, movements reverse to those upon loading described above are performed. In particular, the guide plates 17 and 18 are moved back from the positions shown in FIGS. 10(a) to 10(c), and the cartridge tray 2 is moved upwardly to the position shown in FIGS. 9(a) to 9(c), where after the cartridge tray 2 is moved back together with the left and right guide plates 17 and 18 to the position shown in FIGS. 8(a) to 8(c). However, movements after the demounted position are different. At the demounted position, since the left and right locking levers 3 and 4 are fitted in the locking holes 1-1 and 1-2 of the cartridge 1 to prevent ejection of the cartridge 1 from the cartridge tray 2, the cartridge 1 cannot be removed.

However, the left and right locking levers 3 and 4 are permitted to move in accordance with the pulling operation of the cartridge 1 in the pulling out direction indicated by an arrow mark A2 in FIGS. 5(c) and 5(f) over a distance corresponding to the stroke of the pivots 2-4 and 2-5 fitted in the elongated holes 3-4 and 3-5, respectively.

Figure 12:
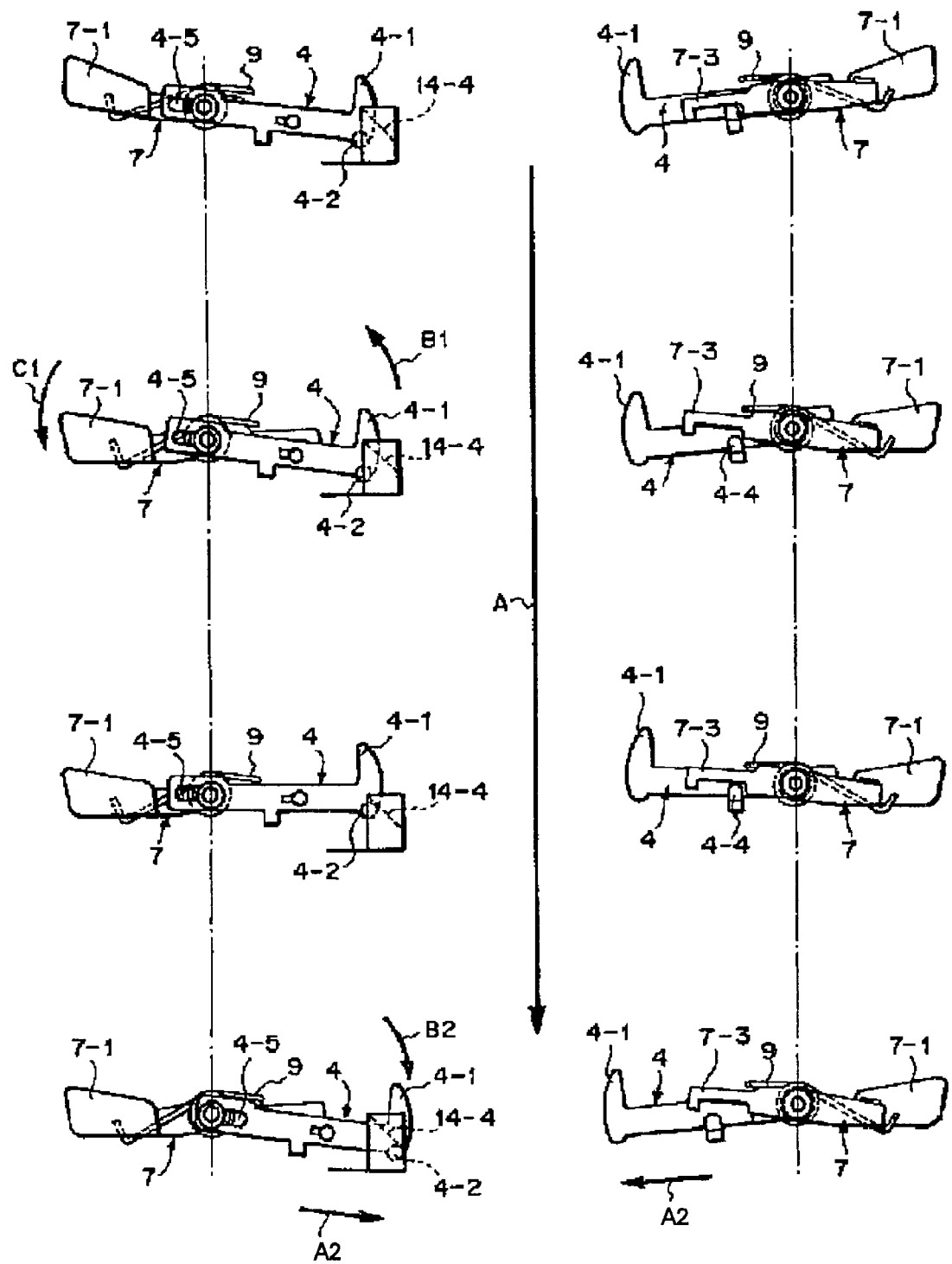
FIG. 12 is an explanatory view illustrating a process of operations after the cartridge is locked by the left lock lever and the left cam lever until it is unlocked.

Consequently, the right side locking lever 3 is engaged at the boss 3-2 thereof with the upper portion of the unlocking cam 13-2 while the left side locking lever 4 is engaged at the boss 4-2 thereof with the upper portion of the unlocking cam 14-4, and the right locking lever 3 and the left locking lever 4 are moved in the pulling out direction along the lower faces of the unlocking cams 13-2 and 14-4, whereupon they are rocked downwardly as indicated by arrow marks B2 and B4 in FIGS. 5(c) and 5(f), respectively. FIG. 12 illustrates such movements of the left and right locking levers 3 and 4 and the left and right cam levers 6 and 7 in an order as indicated by an arrow mark A and in a leftwardly and rightwardly symmetrical relationship.

By the downward rocking movement of the left and right locking levers 3 and 4, the hooked portions 3-1 and 4-1 thereof escape downwardly from the locking holes 1-1 and 1-2 of the cartridge 1, respectively, to unlock the cartridge 1 thereby to allow the cartridge 1 to be removed. Consequently, the requirement for removal of a cartridge required for the cartridge locking mechanism is satisfied.

The locking levers 3 and 4 having unlocked the cartridge 1 are pulled in a rearward direction indicated by an arrow mark A1 and in an upward direction indicated by arrow marks B1 and B2 in FIGS. 5(c) and 5(f), respectively, by the returning force of the locking lever spring 5. Thus, when the cartridge 1 is pulled off, the left and right cam levers 6 and 7 are rocked in upward directions indicated by arrow marks C1 and C3 by the returning force of the torsion springs 8 and 9, respectively.

Thereupon, the projections 3-4 and 4-4 are pressed by the hands 6-3 and 7-3, respectively, and consequently, the locking levers 3 and 4 are maintained in the positions shown in FIGS. 5(a) to 5(c), thereby restoring the initial insertion standby state for the cartridge 1.

On the other hand, the tray locking lever 10 pressed at the cam portion 10-2 thereof by the cartridge 1 is rocked in the clockwise direction indicated by an arrow mark D2 in FIG. 6(a) by the returning force of the torsion spring 12 upon removal of the cartridge 1, whereupon the hooked portion 10-1 is fitted into the locking hole 14-3 of the left side plate 14 as seen in FIGS. 3(a) and 7(b) thereby to lock the cartridge tray 2 again.

In this manner, since, in the present embodiment, the cartridge locking mechanism including the left and right locking levers 3 and 4 is provided on the opposite left and right sides and movement of the cartridge tray between the cartridge insertion standby position and the demounted position is prevented by the mechanism including the tray locking lever 10 and the cam levers 6 and 7 serving as ejection locking levers, the two requirements required for the cartridge locking mechanism upon insertion and removal of a cartridge are satisfied, and besides, not only the pulling off force for a cartridge is stabilized, but also the possibility that inadvertent unlocking of the cartridge may be caused by an impact or the like can be eliminated.

Figure 14A:
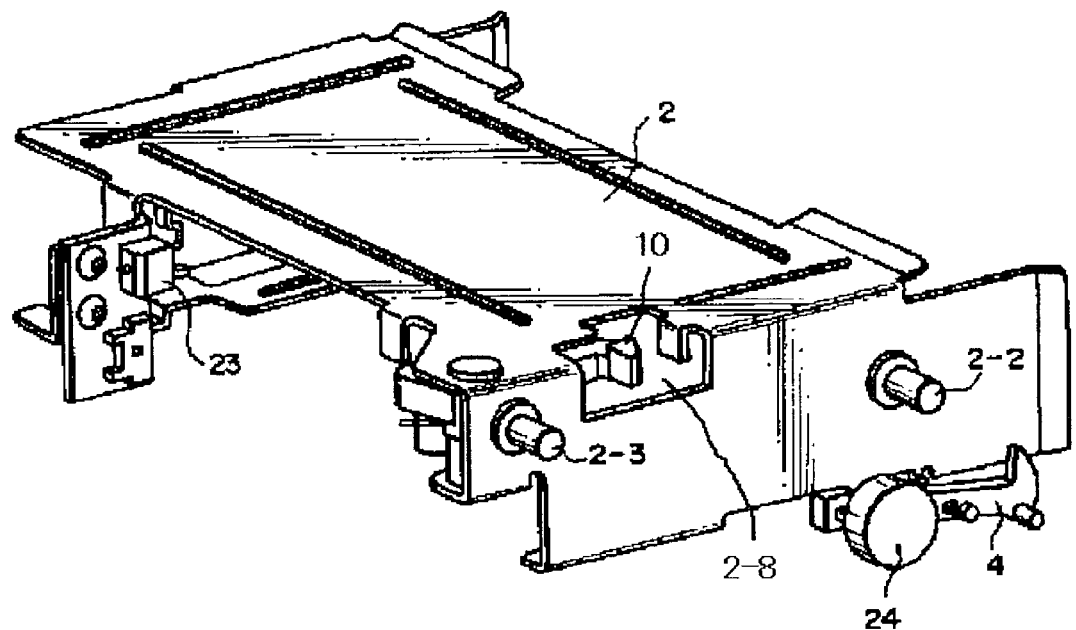
FIGS. 14(a) and 14(b) are a perspective view and a partial enlarged plan view, respectively, showing a modification to the cartridge locking mechanism for a magnetic disk apparatus.

Now, a modification to the cartridge locking mechanism of the embodiment described above is described with reference to FIGS. 14(a) and 14(b).

The modified cartridge locking mechanism is different from the cartridge locking mechanism of the embodiment described above in that the left and right locking levers 3 and 4 mounted for upward and downward rocking motion on the cartridge tray 2 are driven by a motor which serves as a locking and unlocking actuator. In particular, a sensor 23 for detecting a cartridge is disposed rearwardly of the cartridge tray 2, and a motor 24 is disposed at a lower portion of one side of a side face of the cartridge tray 2.

Figure 14B:
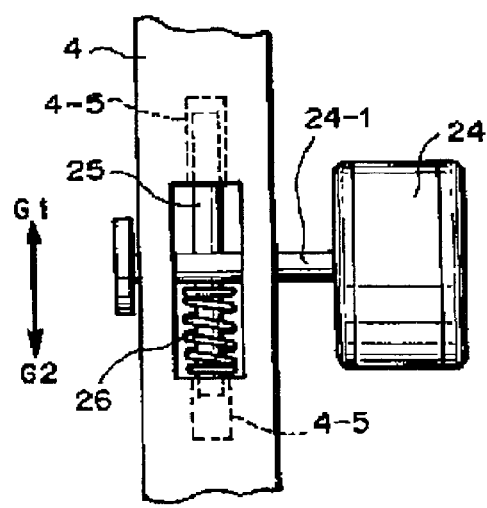
Figure 15A:
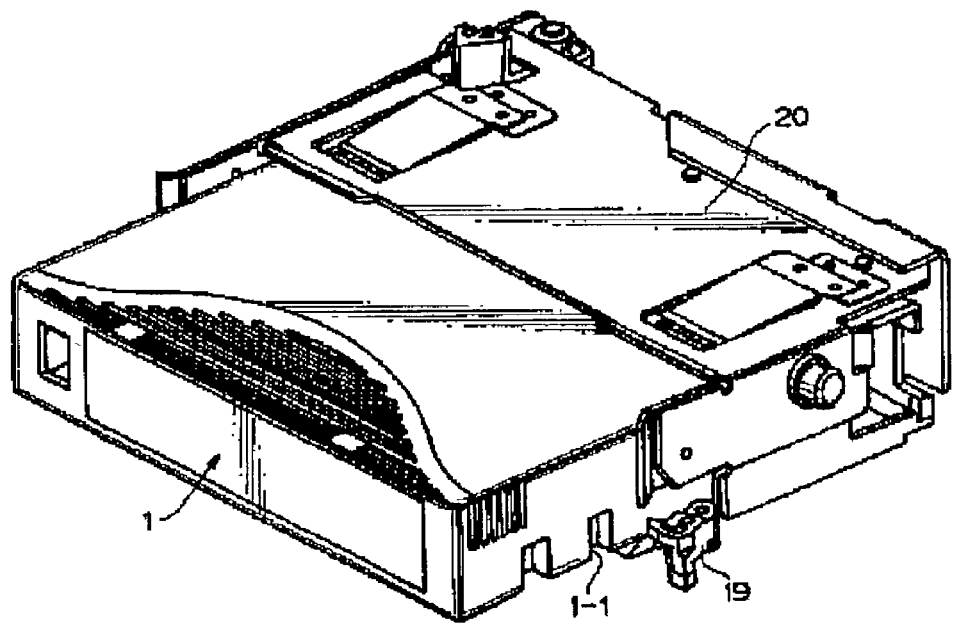
FIG. 15(a) is a perspective view showing a cartridge tray incorporated in a conventional cartridge locking mechanism for a magnetic tape apparatus and a cartridge for use with the magnetic tape apparatus.
Figure 15B:
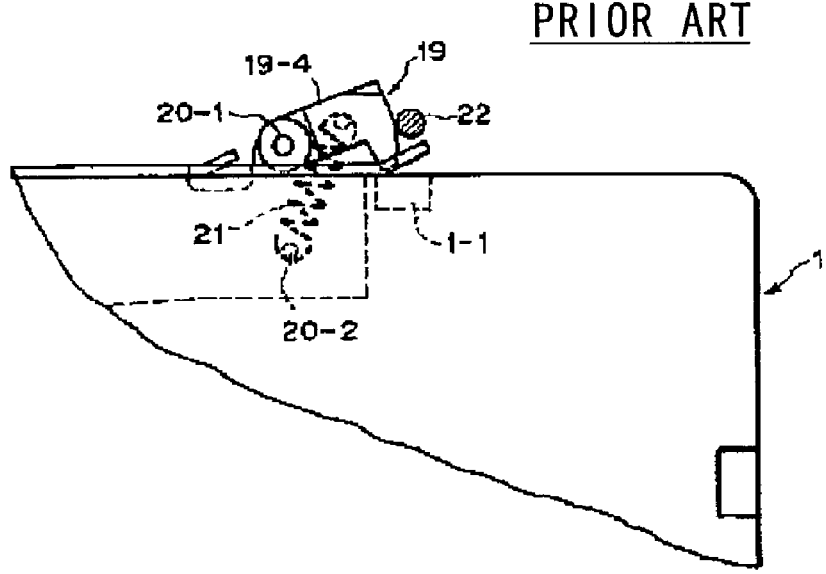
FIG. 15(b) is an enlarged plan view showing a locking lever and several components around the locking lever of the cartridge locking mechanism of FIG. 15(a)
Figure 16:
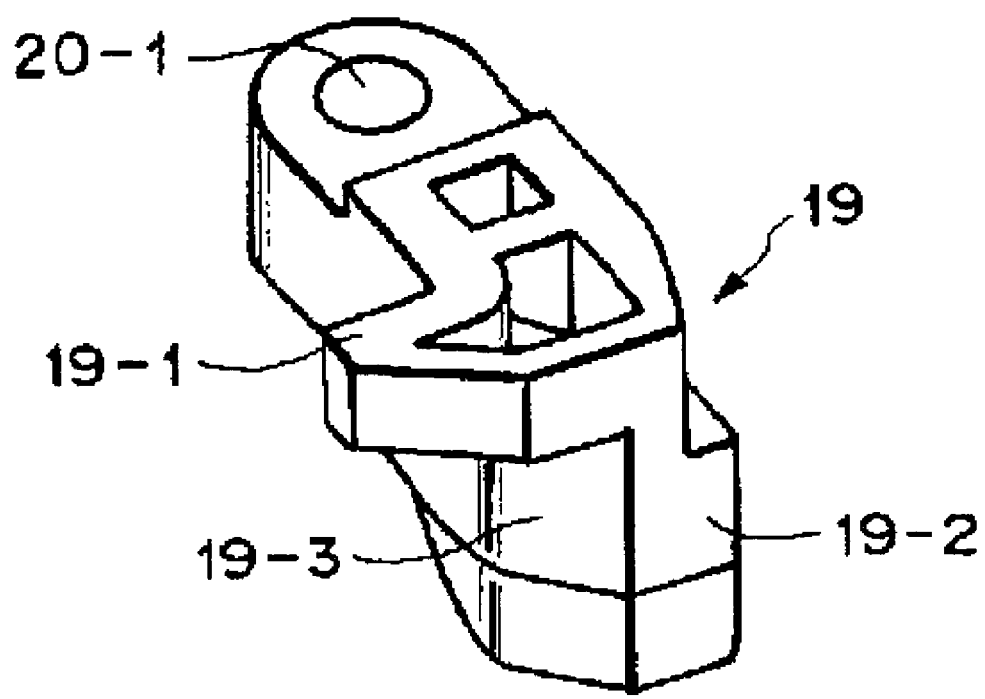
FIG. 16 is an enlarged perspective view showing the locking lever incorporated in the cartridge locking mechanism for a magnetic tape apparatus shown in FIGS. 15(a) and 15(b)
Figure 17A:
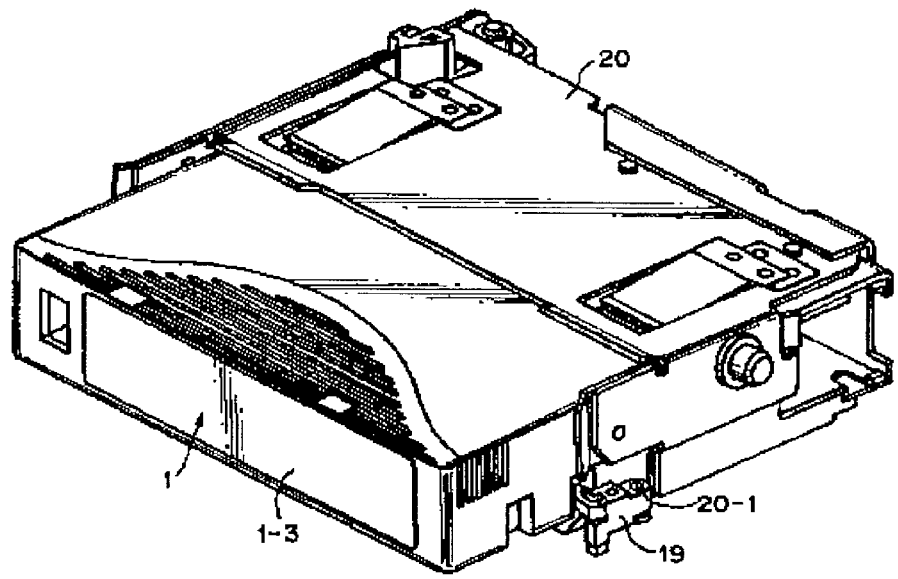
FIG. 17(a) is a perspective view illustrating operation of the cartridge locking mechanism for a magnetic tape apparatus shown in FIG. 15(a)
Figure 17B:
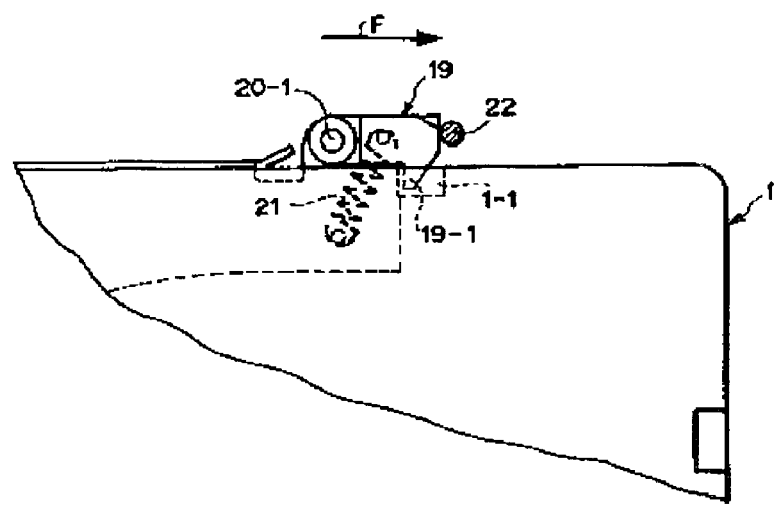
FIG. 17(b) is an enlarged plan view showing the locking lever and several components around the locking lever of the cartridge locking mechanism of FIG. 15(a).

As particularly shown in FIG. 14(b), a guide rod 25 is attached to a rotary shaft 24-1 of the motor 24 such that it extends perpendicularly to the rotary shaft 24-1. The guide rod 25 is inserted in the elongated hole 4-5 formed in the locking lever 4 so that the locking lever 4 can be moved in forward and backward directions indicated by arrow marks G1 and G2. Also the locking lever 3 on the opposite side is configured similarly.

Further, a compression coil spring 26 is wrapped around the guide rod 25 between the rotary shaft 24-1 and the locking lever 4 and biases the left locking lever 4 in the direction of the arrow mark G2.

Now, operation of the modified cartridge locking mechanism is described. If the cartridge 1 is inserted into the cartridge tray 2, then the end face 1-3 thereof shown in FIG. 4(b) is brought into engagement with the cartridge tray 2 and the cartridge 1 is detected by the sensor 23. Consequently, the motor 24 is rotated to pivot the locking lever 4 upwardly to lock the cartridge 1 in a similar manner as described hereinabove in connection with the cartridge locking mechanism of the embodiment.

When the cartridge 1 is to be removed, the locking lever 4 is pulled in the direction of an arrow mark G2 by the removing operation with the cartridge 1 held locked thereon. Simultaneously, the end face 1-3 of the cartridge 1 is disengaged from the sensor 23 to disconnect a switch not shown on the power supply side of the motor. Consequently, the power supply circuit is switched so that the motor 24 is rotated reversely, whereupon the left locking lever 4 is pivoted in a downward direction to unlock the cartridge 1. Thereupon, the left locking lever 4 is pushed in the direction of an arrow mark G1 by the compression coil spring 26 to restore the cartridge insertion stand by position. It is to be noted that, if an encoder or the like is connected to the rotary shaft 24-1 of the motor 24 to control the angle of pivotal motion of the left locking lever 4, then locking and unlocking can be performed with certainty.

It is to be noted that the motor 24 may be replaced by a mechanism including an electromagnet.

While a preferred embodiment of the present invention has been described using specific terms, such description is for illustrative purposes only, and it is to be understood that changes and variations may be made without departing from the spirit or scope of the following claims.

What is claimed is:

1. A cartridge locking mechanism for a magnetic tape apparatus for locking a cartridge of a magnetic tape inserted in a cartridge tray against ejection and unlocking said cartridge when a removing operation is performed for said cartridge, comprising:
    a deck base and a pair of left and right side plates provided uprightly in an opposing relationship to each other on said deck base, wherein said cartridge tray is mounted for forward and backward movement on inner sides of said left and right side plates;
    a pair of left and right locking levers mounted on said cartridge tray for being rocked in a locking direction by insertion of a cartridge into said cartridge tray to engage with a pair of left and right locking portions of said cartridge to lock said cartridge against ejection; and
    unlocking means operable when said cartridge is moved so as to be removed from said cartridge tray for rocking said left and right locking levers simultaneously in an unlocking direction, to cancel the engagement of said locking levers with said locking portions of said cartridge.

2. A cartridge locking mechanism as claimed in claim 1, wherein said unlocking means includes a pair of left and right unlocking portions provided on said left and right side plates such that, when said cartridge is moved so as to be removed from said cartridge tray, said left and right locking levers are brought into contact with and rocked in the unlocking direction by said left and right unlocking portions, respectively, to cancel the engagement thereof with said locking portions of said cartridge.

3. A cartridge locking mechanism as claimed in claim 2, further comprising a pair of left and right cam levers provided along said left and right locking levers and having cam portions which engage, when said cartridge is inserted into said cartridge tray, with said cartridge to rock said left and right locking levers in the locking direction, respectively.

4. A cartridge locking mechanism as claimed in claim 3, wherein said left and right locking levers and said left and right cam levers are supported for rocking motion on common left and right pivots, respectively, and further comprising a returning spring provided for each of said left and right locking levers and said left and right cam levers.

5. A cartridge locking mechanism as claimed in claim 4, wherein said left and right locking levers are supported for forward and backward movement within a predetermined range with respect to said respective pivots.

6. A cartridge locking mechanism as claimed in claim 5, wherein said left and right locking levers have hooked portions for engaging with said left and right locking portions of said cartridge, and said left and right unlocking portions are cams for engaging with said hooked portions of said left and right locking levers to rock said left and right locking levers in the unlocking direction, respectively.

7. A cartridge locking mechanism as claimed in claim 1, further comprising a pair of left and right guide plates mounted for forward and backward movement along inner sides of said left and right side plates, respectively, each of said guide plates having a vertical movement guiding portion for guiding said cartridge tray for upward and downward movements.

8. A cartridge locking mechanism as claimed in claim 7, wherein said vertical movement guide portion is a guide groove for receiving a pin provided in a projecting manner on a side face of said cartridge tray to guide said pin for sliding movement therein.

9. A cartridge locking mechanism as claimed in claim 8, wherein said left and right guide plates have racks formed on upper edges thereof, and said racks are operatively connected to each other by a rotation transmitting mechanism so that said left and right guide plates are moved forwardly and backwardly in synchronism with each other through said racks.

10. A cartridge locking mechanism as claimed in claim 1, further comprising a sensor for detecting said cartridge inserted into or removed from said cartridge tray, and wherein said unlocking means includes an actuator for pivoting said left and right locking levers in the locking direction or the unlocking direction in response to a detection signal of said sensor.

11. A cartridge locking mechanism as claimed in claim 10, wherein said left and right locking levers are mounted for forward and backward movements on said cartridge tray such that, when said cartridge is operated so as to be removed from said cartridge tray, said left and right locking levers are moved together with said cartridge, and when the movement of said cartridge is detected by said sensor, said left and right locking levers are pivoted in the unlocking direction by said actuator.

12. A cartridge locking mechanism for a magnetic tape apparatus for engaging a cartridge inserted in said magnetic tape apparatus and canceling the engagement in response to a removing operation for said cartridge, comprising:

a cartridge tray into which a cartridge of a magnetic tape is inserted;

a cam lever provided on said cartridge tray for being pushed by said cartridge inserted into said cartridge tray to rock in one direction;

a locking lever provided on said cartridge tray for being biased by a face of said cartridge in an interlocking relationship with said cam lever to engage an engaging portion of said cartridge;

a spring provided on said cartridge tray for maintaining a relative positional relationship between said cam lever and said locking lever; and an inclined portion being formed on a body of said magnetic tape apparatus for guiding said locking lever in a direction away from the face of said cartridge by the removing operation for said cartridge to cancel the engagement with the engaging portion of said cartridge.

13. The cartridge locking mechanism for a magnetic apparatus as claimed in claim 12, wherein said body includes a pair of left and right side plates provided uprightly in opposing relationship to each other on a deck base and a pair of guide plates mounted for forward and backward movement along the inner sides of said side plates for guiding said cartridge tray being inserted, said inclined portion being formed on each of said side plates.

14. A cartridge locking mechanism for a magnetic apparatus as claimed in claim 13, wherein said locking lever is movable relative to said cartridge tray through an elongated hole.

15. A cartridge locking mechanism for a magnetic apparatus as claimed in claim 13, wherein each of said guide plates has a rack formed at an upper end thereof, and the racks are connected to each other through a rotation transmission apparatus.

16. The mechanism of claim 1, wherein said cartridge tray comprises a gate-shaped cartridge tray.

17. The mechanism of claim 1, wherein said cartridge tray comprises:

a top plate portion;

a pair of left and right side plate portions; and a pair of left and right cartridge supporting portions extending inwardly from lower ends of the pair of left and right side plate portions.

18. The mechanism of claim 17, wherein said pair of left and right locking levers are pivotally mounted on the pair of left and right cartridge supporting portions.

19. The mechanism of claim 18, wherein each of said pair of left and right locking levers comprises a horizontally extending boss.

20. The mechanism of claim 19, wherein each of said left and right side plates comprises an unlocking cam adapted to engage a corresponding horizontally extending boss on said pair of left and right locking levers when said cartridge tray and said cartridge locked within said cartridge tray is moved in a removing direction.

21. The mechanism of claim 20, wherein said movement of said cartridge tray and said cartridge locked by said left and right locking levers are moved in a removing direction engagement of said horizontally extending bosses with said unlocking cams unlock said cartridge from said cartridge tray.

22. A cartridge locking mechanism comprising:
a pair of right and left side plates on a deck base;
a cartridge tray movably mounted on said left and right side plates; and
a pair of left and right locking members mounted on said cartridge tray,
wherein said left and right locking members are adapted to lock a cartridge within said cartridge tray and to unlock said cartridge from said cartridge tray upon engaging said pair of right and left side plates when said cartridge tray and said cartridge are moved with respect to said pair of right and left side plates in a removing direction.

23. The mechanism of claim 22, wherein said cartridge tray comprises:
a top plate portion;
a pair of left and right side plate portions; and
a pair of left and right cartridge supporting portions extending inwardly from lower ends of the pair of left and right side plate portions.

24. The mechanism of claim 23, wherein
said pair of left and right locking levers is pivotally mounted on the pair of left and right cartridge supporting portions,
each of said pair of left and right locking levers comprises a horizontally extending boss,
each of said left and right side plates comprises an unlocking cam adapted to engage a corresponding horizontally extending boss on said pair of left and right locking levers when said cartridge tray and said cartridge locked within said cartridge tray are moved in a removing direction, and
said movement of said cartridge tray and said cartridge locked by said left and right locking levers in a removing direction causes engagement of said horizontally extending bosses with said unlocking cams to unlock said cartridge from said cartridge tray.

* * * * *